United States Patent
Garg et al.

(10) Patent No.: US 12,407,572 B2
(45) Date of Patent: Sep. 2, 2025

(54) METHOD AND APPARATUS TO CREATE A VIRTUALIZED REPLICA OF A COMPUTER NETWORK

(71) Applicant: Extreme Networks, Inc., San Jose, CA (US)

(72) Inventors: Sumit Garg, Apex, NC (US); Donald B. Grosser, Apex, NC (US); Jeffrey L. Barnhill, Cary, NC (US); Gorden Jennings, Panama City, FL (US); Tony Wang, San Jose, CA (US); Yarnin Israel, San Jose, CA (US); Shangquan Wen, San Jose, CA (US); Girish Kumar Karunagaran, San Ramon, CA (US); Junjie Ma, San Jose, CA (US)

(73) Assignee: Extreme Networks, Inc., San Jose, CA (US)

( * ) Notice: Subject to any disclaimer, the term of this patent is extended or adjusted under 35 U.S.C. 154(b) by 0 days.

(21) Appl. No.: 18/521,543

(22) Filed: Nov. 28, 2023

(65) Prior Publication Data

US 2025/0175384 A1    May 29, 2025

(51) Int. Cl.
*H04L 41/082*    (2022.01)
*H04L 41/084*    (2022.01)
*H04L 41/0895*    (2022.01)

(52) U.S. Cl.
CPC .......... *H04L 41/082* (2013.01); *H04L 41/084* (2013.01); *H04L 41/0895* (2022.05)

(58) Field of Classification Search
CPC .. H04L 41/082; H04L 41/084; H04L 41/0895
See application file for complete search history.

(56) References Cited

U.S. PATENT DOCUMENTS

| 5,946,472 A | 8/1999 | Graves et al. |
| 10,320,625 B1 | 6/2019 | Cherumbath |

(Continued)

OTHER PUBLICATIONS

VMware's vCenter Converter, https://www.vmware.com/products/conver, downloaded Jul. 14, 2023; 6 pages.

(Continued)

*Primary Examiner* — Richard G Keehn
(74) *Attorney, Agent, or Firm* — Sterne, Kessler, Goldstein & Fox P.L.L.C.

(57) ABSTRACT

Disclosed herein are system, method, and computer program product aspects for generating a virtual replica of a physical network. An aspect operates by receiving, from a network management system (NMS), a request to generate a network digital twin (network-DT) instance corresponding to a physical network that includes a plurality of physical network devices, where the request includes link connectivity information corresponding to the physical network and a respective plurality of device characteristics corresponding to each of the plurality of physical network devices. A plurality of device digital twin (device-DT) instances are generated, each corresponding to a respective physical network device of the plurality of physical network devices, where each device-DT instance of the plurality of device-DT instances is generated based on the respective plurality of device characteristics corresponding to the respective physical network device. The network-DT instance is generated based on the plurality of device-DT instances and the link connectivity information.

20 Claims, 6 Drawing Sheets

(56) References Cited

U.S. PATENT DOCUMENTS

| | | |
|---|---|---|
| 11,012,566 B1 | 5/2021 | Velusamy |
| 11,863,450 B1 | 1/2024 | Obediente et al. |
| 2006/0253588 A1 | 11/2006 | Gao et al. |
| 2015/0067143 A1 | 3/2015 | Babakhan et al. |
| 2016/0364201 A1 | 12/2016 | Beveridge et al. |
| 2020/0328776 A1 | 10/2020 | Scholand et al. |
| 2020/0382412 A1 | 12/2020 | Chandrappa et al. |
| 2020/0389373 A1* | 12/2020 | Barton ................ H04L 41/0895 |
| 2021/0306416 A1* | 9/2021 | Mukhopadhyay ........................... H04L 41/0846 |
| 2022/0100647 A1 | 3/2022 | Hamid |
| 2022/0200917 A1* | 6/2022 | Mortensen ............ H04L 41/145 |
| 2022/0237243 A1 | 7/2022 | DeLuca et al. |
| 2024/0037020 A1 | 2/2024 | Hamid |
| 2024/0095158 A1 | 3/2024 | Miriyala et al. |
| 2024/0112506 A1* | 4/2024 | Smith ................ H04L 41/0895 |
| 2024/0160466 A1* | 5/2024 | Yuan ................ H04L 41/0895 |
| 2024/0195683 A1* | 6/2024 | Wang ................ H04L 41/0823 |
| 2024/0406277 A1 | 12/2024 | Henkel et al. |
| 2025/0004463 A1* | 1/2025 | Ezrielev ............ G05B 23/0275 |

OTHER PUBLICATIONS

U.S. Appl. No. 18/362,259, filed Jul. 31, 2023; 64 pages.

* cited by examiner

METHOD AND APPARATUS TO CREATE A VIRTUALIZED REPLICA OF A COMPUTER NETWORK

BACKGROUND

Computer network management involves configuring, monitoring, updating, and troubleshooting network devices. Network management systems facilitate the centralized management of network devices, such as routers, switches, firewalls, and servers. They allow network administrators to configure and control network devices, manage updates, and enforce standardized configurations across the network.

Validating changes to a network, such as device configuration updates or the rollout of new applications and devices, prior to deployment is essential to reduce the risk of introducing disruptions or issues in the production network. However, modern networks can be highly complex, consisting of numerous devices, protocols, and interconnected systems. Validating configuration changes in such intricate environments can be challenging due to the sheer scale and interdependencies involved.

SUMMARY

Some aspects of this disclosure relate to apparatuses and methods for creating a virtual replica of a computer network. For example, some aspects of this disclosure relate to using network device parameters and link connectivity information to customize a virtual-replica template and instantiate a digital twin instance of a physical network.

Some aspects of this disclosure relate to a network system with a memory and a processor coupled to the memory. The processor receives, from a network management system (NMS), a request to generate a network digital twin (network-DT) instance corresponding to a physical network including a plurality of physical network devices. According to some aspects, the request includes link connectivity information corresponding to the physical network and a respective plurality of device characteristics corresponding to each of the plurality of physical network devices. The processor then generates a plurality of device digital twin (device-DT) instances, each corresponding to a respective physical network device of the plurality of physical network devices, where each device-DT instance of the plurality of device-DT instances is generated based on the respective plurality of device characteristics corresponding to the respective physical network device. The processor then generates the network-DT instance based on the plurality of device-DT instances and the link connectivity information, and a management channel is established between the network-DT instance and the NMS.

According to some aspects, the processor receives, over the management channel, a request to modify configuration of the network-DT from the NMS, where the request to modify configuration includes a set of modified configuration parameters. The processor then updates the configuration of the network-DT instance based on the modified configuration parameters, and synchronizes the updated configuration of the network-DT instance and a running configuration of the physical network device using the management channel. According to some aspects, the configuration of the network-DT includes link connectivity information corresponding to the physical network. According to some aspects, the processor validates control plane, management plane, and data plane operations using the network-DT with the updated configuration.

According to some aspects, to generate a device-DT instance of the plurality of device-DT instances the processor selects a virtual-replica template from a plurality of virtual-replica templates based on a first plurality of device characteristics of the respective plurality of device characteristics. The processor then customizes the virtual-replica template based on the second plurality of device characteristics of the respective plurality of device characteristics, and generates the device-DT instance of the physical network device based on the customized virtualized-replica template.

Some aspects of this disclosure relate to a non-transitory computer-readable medium (CRM) having instructions stored thereon that, when executed by at least one computing device, causes at least one computing device to perform various operations. According to some aspects, the operations include receiving a request to generate a network digital twin (network-DT) instance corresponding to a physical network including a plurality of physical network devices, where the request includes link connectivity information corresponding to the physical network and a respective plurality of device characteristics corresponding to each of the plurality of physical network devices. The operations further include generating a plurality of device digital twin (device-DT) instances, each corresponding to a respective physical network device of the plurality of physical network devices, where each device-DT instance of the plurality of device-DT instances is generated based on the respective plurality of device characteristics corresponding to the respective physical network device. The operations further include generating the network-DT instance based on the plurality of device-DT instances and the link connectivity information, and establishing a management channel between the network-DT instance and the NMS.

This Summary is provided merely for purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Provided herein are system, apparatus, device, method and/or computer program product aspects, and/or combinations and sub-combinations thereof, for creating a virtual replica of a computer network. For example, aspects herein describe generating a digital twin (DT) instance of a network (e.g., a computer network) on a cloud network.

Validating network and configuration changes prior to deployment reduces the risk of introducing disruptions at runtime. A physical sandbox environment can be used for validating the effectiveness of upgrades, such as new hardware, software updates, or configuration changes, and verifying their impact on network performance. A sandbox network is a separate and isolated network environment that closely resembles the production network but is used specifically for testing and troubleshooting.

The sandbox network should mirror the production environment as closely as possible to ensure accurate network testing and validation. Creating a replica of the production network in the sandbox environment involves setting up similar network devices, servers, applications, and connectivity configurations. In addition, existing network device configurations also should be replicated from the production environment. However, duplicating network devices to create a physical sandbox network that resembles the production network can be an arduous, time-consuming process, and potentially cost prohibitive.

To solve the above technological problem, aspects of this disclosure describe creating a DT instance of a physical network (herein referred to as "network-DT") that provides cost-effective network configuration assurance and network modeling. Furthermore, the network-DT includes multiple device-DTs, where each device-DT is a DT instance corresponding to a network device of the physical network. According to some aspects, the network-DT and/or the device-DT can be created automatically with no (or minimum) involvement from a user (e.g., a network administrator).

Figure 1:
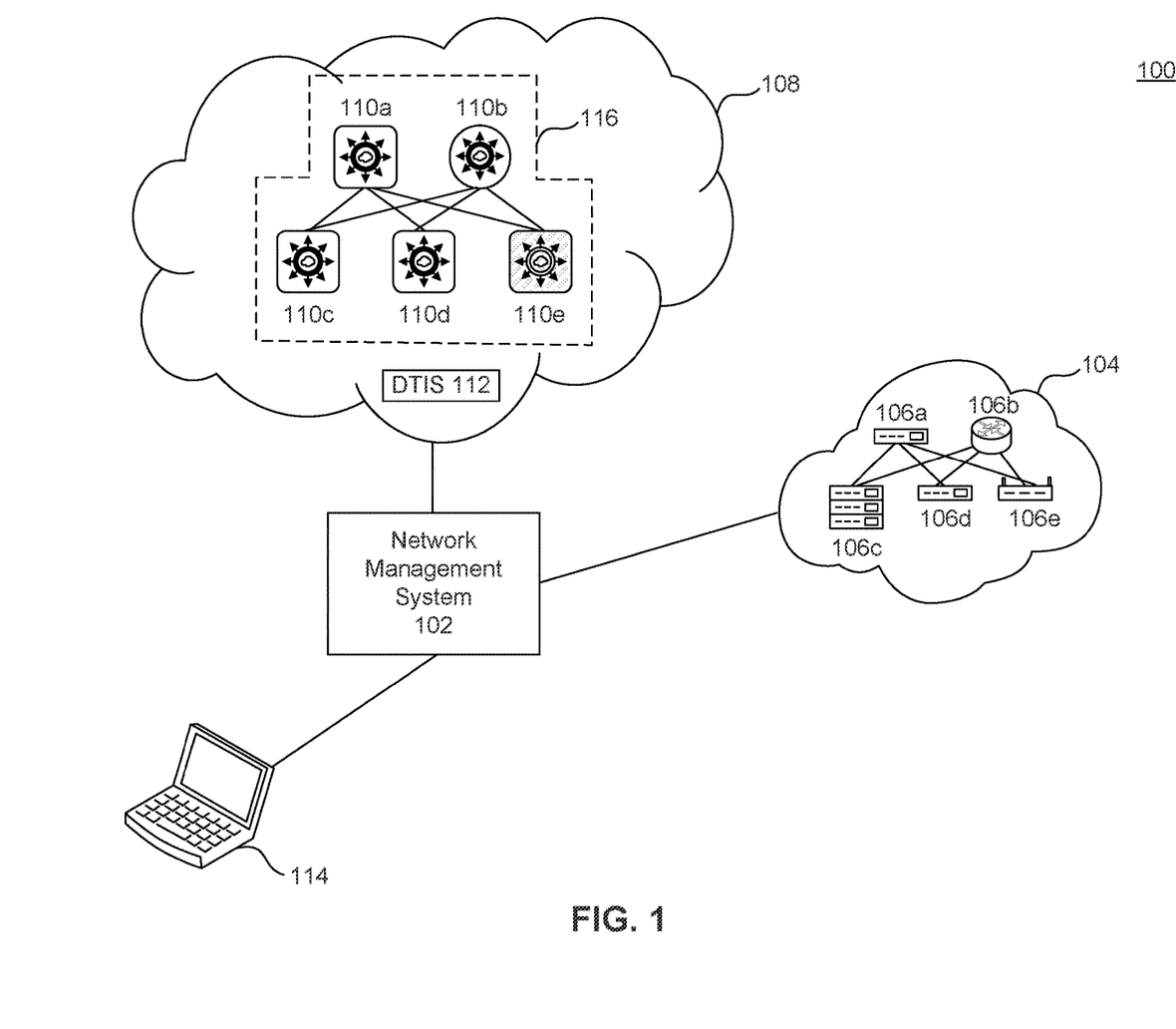
FIG. 1 illustrates an example network system for generating a virtualized replica of a computer network, according to some aspects of the disclosure.

FIG. 1 illustrates an example network system 100 for generating a virtualized replica of a computer network, according to some aspects of this disclosure. Network system 100 includes network management system (NMS) 102, physical network 104, virtual cloud network 108, and client device 114. Physical network 104 includes one or more physical network devices 106a-106e. Furthermore, virtual cloud network 108 includes network digital twin (network-DT) 116 which is a virtual replica of physical network 104. Network-DT 116 includes one or more device digital twins (device-DTs) 110a-110e. According to some aspects, each of the device-DTs 110a-110e is a virtual replica of one of the physical network devices 106a-106e. Hence, each device-DT has a counterpart physical network device in the physical network 104. Alternately, a device-DT may also be a virtual replica of more than one physical network device 106a-106e (e.g., two or more network switches in a stacked configuration).

According to some aspects, each of the physical network devices 106a-106e may be a router, switch, bridge, network gateway, server, host, and/or the like. According to some aspects, one or more physical network devices (e.g., one or more of the physical network devices 106a-106e) may be a wired client and/or a wireless client. Furthermore, one or more physical network devices (e.g., one or more of the physical network devices 106a-106e) may be a wireless local area network (WLAN) access point and/or a WLAN controller. According to some aspects, hardware attributes of a physical network device 106a-106e may include model name, serial number, MAC addresses, device expansion module type, interface module type, stacking composition, and the like. According to some aspects, software attributes of a physical network device 106a-106e may include network operating system (NOS) type, NOS version, feature license(s), and the like. Furthermore, each physical network device 106a-106e may be configured with a plurality of configuration parameters that include virtual local area network (VLAN) parameters, spanning tree protocol (STP) parameters, open shortest path first (OSPF) parameters, fabric parameters, virtual router redundancy protocol (VRRP) parameters, and the like.

According to some aspects, network-DT 116 may be implemented by, for example, a data center including one or more servers in the cloud. According to some aspects, cloud network 108 may include one or more physical devices and/or one or more applications hosted on a distributed computing platform, a cloud computing platform, a centralized hardware system, a server, a computing device, and/or an external network-to-network interface device, among others.

According to some aspects, device-DTs 110a-110e of network-DT 116 are virtual replicas of physical network devices 106a-106e. Hence, the hardware attributes, the software attributes, and the device configuration of a device-DT and its corresponding physical network device may be identical. According to some aspects, a physical network device (e.g., one of the physical network devices 106a-106e) and its corresponding device-DT in network-DT 116, may be configured with the same network operating system (NOS). For example, physical network device 106a and device-DT 110a may be configured with the same NOS. For example, physical network device 106c and device-DT 110c may be configured with the same NOS. In some examples, physical network device 106a and physical network device 106c (and their corresponding device-DT) use different NOS. According to some aspects, when the physical network device is a host device, the corresponding device-DT instance in network-DT 116 may simulate and generate network traffic. Accordingly, a device-DT in network-DT 116 may have internet connectivity if the corresponding physical network device in physical network 104 has internet connectivity. According to some aspects, device-DTs 110a-110e are configured with virtualized NOS instantiated in cloud network 108.

According to some aspects, network-DT 116 is a virtualized replica of the physical network 104. Accordingly, the configuration of interconnections between device-DTs 110a-110e mirrors the configuration of interconnections between physical network devices 106a-106e. Since network-DT 116 mirrors the characteristics of physical network 104, network-DT 116 provides a sandbox environment to validate the management plane, control plane, and data plane features of physical network 104. According to some aspects, the use cases for which network-DT 116 can be utilized include, but are not limited to, validating new configuration and/or new features, validating software upgrades for devices in the network, scaled feature/device validations, agile customer demonstrations including various solution components, device/portfolio interoperability, network planning and best-practice applications, and the like. According to some aspects, the network-DT 116 instance replicates a physical device and is capable of forwarding network traffic based on the configured features.

According to some aspects, NMS 102 manages the operation and function of physical network devices 106a-106e. According to some aspects, NMS 102 may be a cloud-based network management system. Client device 114 may communicate with NMS 102 using an application programming interface (API) and/or a graphical user interface (GUI) to configure and manage physical network devices 106a-106e and/or device-DTs 110a-110e. Alternatively or additionally, NMS 102 may communicate with the physical network devices 106a-106e using a wired link (e.g., coaxial cable, Ethernet cable, fiber optic cable, etc.), a wireless link and/or combinations thereof. According to some aspects, NMS 102 can be deployed as an on-premise solution (i.e., without deploying on an external cloud network). According to some aspects, NMS 102 may automate the management of physical network devices 106a-106e and/or device-DTs 110a-110e using a software defined networking (SDN) controller. According to some aspects, client device 114 may access NMS 102 via a password protected user interface. According to some aspects, NMS 102 may provide access to devices remotely using secure shell (SSH), secure socket layer (SSL)/transport layer security (TLS) protocols. According to some aspects, NMS 102 may support simple network management protocol (SNMP) protocol.

Furthermore, NMS 102 may support full-stack management of physical network devices 106a-106e and enable management operations such as onboarding, configuration, monitoring, troubleshooting, reporting, and the like. According to some aspects, a user can set up a network by onboarding physical network devices 106a-106e onto the NMS 102. Using NMS 102, the user can configure and manage the network devices 106a-106e. As an example, users can define global settings, view device status, and customize device configurations at the device level. According to some aspects, using NMS 102, users can assign devices to an existing user-defined location tree within the context of NMS 102.

According to some aspects, digital twin instantiation service (DTIS) 112 performs a variety of functions such as instantiating, updating, life-cycle management, deleting DTs, interconnection management of DT-devices, and auto horizontal scaling based on the size of physical network 104. According to some aspects, DTIS 112 communicates with NMS 102 to exchange device characteristics and interconnectivity configuration corresponding to physical network devices 106a-106e. According to some aspects, in case a DT-device goes into erroneous state, DTIS 112 is responsible of recovering the DT-device either by shutting it down and relaunch it, recreating the links between the device-DT instances, or recreating a whole new instance with the same configuration. According to some aspects, when a DT-device goes into erroneous state, DTIS 112 recreates a new DT-device instance using a saved bundled configuration and/or a preserved disk from the previous instance. DTIS 112 can be implemented on virtual cloud network 108. However, DTIS 112 can be co-located with NMS 102, according to some aspects.

Figure 2:
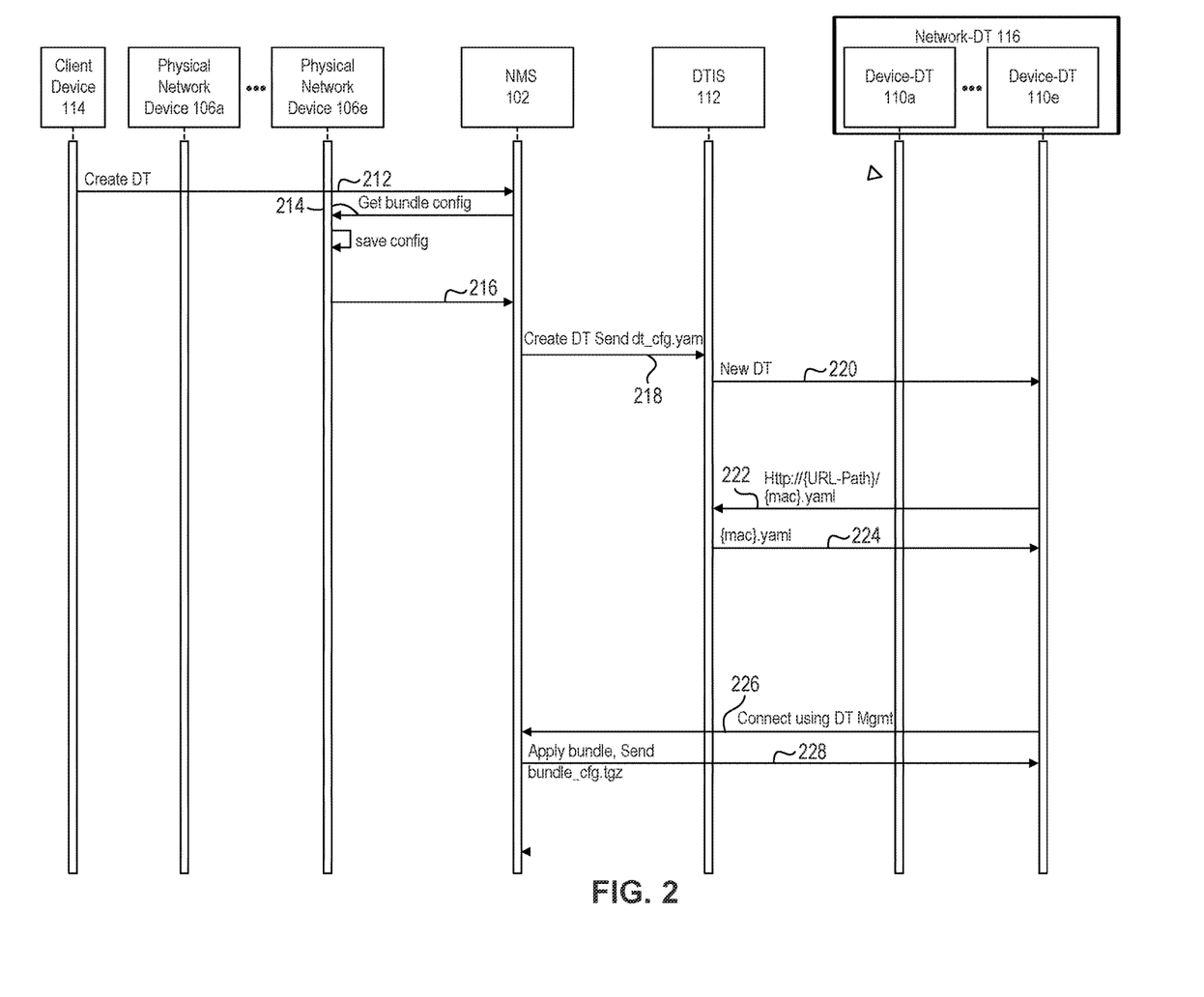
FIG. 2 illustrates an example exchange of communications that may occur in a network system to create a network digital twin, according to some aspects of the disclosure.

According to some aspects, DTIS 112 maintains instances of virtualized NOS and virtual-replica templates. According to some aspects, DTIS 112 may store a plurality of virtual-replica templates corresponding to various types of physical network devices, such as routers, switches, bridges, network gateways, servers, hosts, and the like. According to some aspects, a virtual-replica template may define a superset of hardware and software attributes corresponding to a respective type of network device. For each type of physical network device, DTIS 112 may maintain a configurable virtual-replica template that can be configured based on a variety of hardware and software attributes. According to some aspects, a virtual-replica template can be configured and instantiated to generate a virtual replica of a corresponding physical network device FIG. 2 illustrates an example exchange of communications that may occur in a network system to create a digital twin of a network device, according to some aspects of this disclosure. In the illustrated example, the network system 200 includes a client device 114, physical network devices 106a-106e, NMS 102, DTIS 112, and network-DT 116 that includes device-DTs 110a-110e.

At 212, client device 114 initiates creating a network twin instance using a user interface of NMS 102. According to some aspects, client device 114 sends a request to NMS 102 to create a DT instance of physical network 104 on a cloud network (e.g., virtual cloud network 108). In the example of FIG. 2, network-DT 116 is the DT instance of physical network 104 which includes physical network devices 106a-106e. According to some aspects, client device 114 may communicate with NMS using an application programming interface (API). The request to generate a DT instance corresponding to physical network 104 may be sent as a REST API call.

According to some aspects, NMS 102 may display a list of managed network devices in a physical network to a user of client device 114. According to some aspects, the physical network 104 may be a large network with thousands of network devices spread over multiple buildings, multiple floors of a building, and/or over several campuses of an institution. According to some aspects, a graphical interface of NMS 102 may display a topological map of the physical network at user device 112. According to some aspects, using NMS 112, a user of client device 114 may select a portion of physical network 104 (e.g., physical network devices located on a single floor of a building or in a single campus) to replicate in cloud network 108. According to some aspects, user of client device 114 may select the entire physical network 104 to replicate in cloud network 108. A user of client device 114 may select a portion of the physical network 104 by drawing a boundary around a selected portion on the displayed topological map of the physical network. According to some aspects, a user may select a set of physical network devices in physical network 104 based on their serial numbers and/or model numbers. Additionally, the user may make a selection of a set of physical network devices in the physical network 104 based on their OS persona, device model, and/or OS version.

At 214, NMS 102 sends a request to the physical network devices within the selected portion of the physical network to send details corresponding to their running configuration. According to some aspects, NMS 102 may communicate with physical a network device (e.g., physical network devices 106a-106e) using SSH, SSL/TLS, and/or SNMP protocols. According to some aspects, NMS 102 may send a <get> or a <get-config> remote procedure call (RPC) message to obtain a configuration bundle from a physical network device of physical network 104. However, the aspects of this disclosure are not limited to these examples and can include other requests.

At 216, a physical network device (e.g., physical network device 106e) generates a bundle of its current configuration and/or its operating system characteristics, and sends it to NMS 102. According to some aspects, configuration details sent by each of the physical network devices includes physical attributes of the device, device model, NOS version, and/or the like. According to some aspects, NMS 102 may actively manages all devices of physical network 104, and it may have information corresponding to the hardware and software attributes of physical network devices 106a-106e. According to some aspects, client device 114 may obtain configuration details corresponding to one or more physical network devices (e.g., physical network devices 106a-106e) and their corresponding device-DTs from NMS 102 and store the configuration details (e.g., on local memory). At 216, a physical network device (e.g., physical network device 106e) may load a previously saved configuration (e.g., configuration corresponding to physical network device 106e) and send it to NMS 102.

According to some aspects, NMS 102 may obtain link connectivity information from physical network devices 106a-106e. Physical network devices 106a-106e may learn layer 2 and layer 3 connectivity information through network discovery. According to some aspects, physical network devices 106a-106e may obtain link connectivity information using traceroute, simple network management protocol (SNMP) and/or link layer discovery protocol (LLDP). According to some aspects, using LLDP each physical network device (e.g., physical network devices 106a-106e) may obtain information corresponding to the neighboring devices. Neighbor device information that can be obtained using LLDP include device name and capabilities, MAC addresses, Port IDs, and management addresses. Using the LLDP information obtained from physical network devices 106a-106e, NMS 206 may create a topology map that provides a comprehensive view of network connectivity of the physical network 104.

At 218, NMS 102 sends a request to DTIS 112 to create a DT instance of physical network 104 having physical network devices 106a-106e. According to some aspects, NMS 102 sends a request to DTIS 112 using a REST API call or a gRPC (gRPC remote procedure call). According to some aspects, the request to DTIS 112 includes a plurality of device characteristics corresponding to the physical network devices 106a-106e. According to some aspects, NMS 102 may send to DTIS 112 the link connectivity information corresponding to physical network devices 106a-106e. The link connectivity information sent by NMS 102 may include the identities of the directly connected neighboring devices for each physical network device and the ports that are used for connecting to the neighboring devices.

According to some aspects, the request may include hardware attributes of physical network devices 106a-106e. Alternatively, the request may include both hardware attributes and software attributes of physical devices 106a-106e. According to some aspects, the request may include hardware attributes of physical network devices 106a-106e, such as model name, serial number, MAC addresses, device expansion module type, interface module type, stacking composition, and the like. According to some aspects, the request may include software attributes of physical network devices 106a-106e, such as NOS type, NOS version, feature license(s), and the like. Furthermore, the request includes the running configuration of physical each physical network device and/or configuration parameters such as VLAN parameters, STP parameters, OSPF parameters, fabric parameters, VRRP parameters, and the like. According to some aspects, at 218, NMS 102 sends information corresponding to device characteristics, including link connectivity information.

At 220, DTIS 112 initiates the instantiation of network-DT 116 having device-DTs 110a-110e. According to some aspects, DTIS 112 may generate an instantiation of network-DT 116 using the device characteristics and the link connectivity information obtained from NMS 102. DTIS 112 may store a plurality of virtual-replica templates and/or NOS images corresponding to various types of physical network devices. According to some aspects, each virtual-replica template may correspond to a specific hardware model of a specific type of physical network device (e.g. a specific model of a network switch). In addition, each virtual-replica template may define a superset of hardware and software attributes corresponding to a respective type of network device. In some aspects, DTIS 112 and network-DT 116 can be collocated (e.g., initially) on the same cloud network.

According to some aspects, at 220, DTIS 112 creates a device-DT corresponding to each of the physical network devices 106a-106e in the physical network 104. For example, DTIS 112 create instances of device DTs 110a, 110b, . . . , and 110e which are the digital replicas of physical network devices 106a, 106b, . . . , and 106e, respectively. According to some aspects, to create instances of device-DTs 110a-110e, DTIS 112 may select a virtual-replica templates based on one or more hardware characteristics of the corresponding physical network devices. For example, to create device-DT 110e, DTIS 112 may select a predefined virtual-replica template based on one or more hardware characteristics of the physical network device 106e. According to some aspects, each virtual-replica template may have a memory requirement value based on the hardware model of the corresponding physical network device. According to some aspects, a virtual-replica template may specify predefined ports for communication between DTIS 112 and the corresponding device-DT of network-DT 116, and/or for communication within network-DT 116. DTIS 112 and/or NMS 102 may further customize the selected virtual-replica templates based on one or more software characteristics and/or hardware characteristics of physical network devices 106a-106e. DTIS 112 may then instantiate the customized virtual-replica templates to generate device-DTs 110a-110e. According to some aspects, the hardware characteristics based on which DTIS 112 selects and/or customizes a virtual-replica template may include, but are not limited to, model name, serial number, MAC addresses, device expansion module type, interface module type, and stacking composition. According to some aspects, the software characteristics based on which DTIS 112 customizes a virtual-replica template may include, but are not limited to, NOS type, NOS version, feature licenses, VLAN parameters, STP parameters, OSPF parameters, fabric parameters, VRRP parameters, and the like.

According to some aspects, once the device-DTs 110a-110e are instantiated, DTIS 112 may use the link connectivity information obtained from NMS 102 to generate virtual connections between the device-DTs to create network-DT 116. The connectivity between device-DTs 110a-110e may mirror the connectivity between the physical network devices 106a-106e of the physical network 104. According to some aspects, the instantiated virtual connection between two device-DTs (e.g., between device DTs 110a and 110c) may be selected to have a similar bandwidth and propagation characteristics as the physical connection between the counterpart physical network devices (e.g., between physical network devices 106a and 106c).

At 222, device-DT instances 110a-110e may request additional device characteristics information from DTIS 112. According to some aspects, at 222, a base version of an instantiation of device-DT (e.g., device-DT 110e) may request additional hardware and/or software characteristics and/or connectivity information corresponding to its counterpart physical network device (i.e., physical network device 106e). According to some aspects, a device-DT instance may send a <get> RPC message to obtain device characteristics information from DTIS 112.

At 224, DTIS 112 sends additional hardware and/or software characteristics corresponding to physical network device 204. Device-DT 210 may be further customized based on the received hardware and/or software characteristics. According to some aspects, NMS 102 and/or DTIS 112 may create a DT management channel between NMS 102 and each of the device-DTs of network-DT 116, via DTIS 112. According to some aspects, the management channel can be established using SSH or SSL/TSL protocols.

At 226, a device-DT of network-DT 116 (e.g., device-DT 110e) may request NMS 102 to send information corresponding to the current running configuration of its counterpart physical network device (e.g., physical network device 106e). A device-DT may communicate with NMS 102 using the management channel. At 228, the requesting device-DT may receive an updated configuration bundle from NMS 102, and the device-DT is further customized and/or updated based on the received running configuration parameters.

Figure 3:
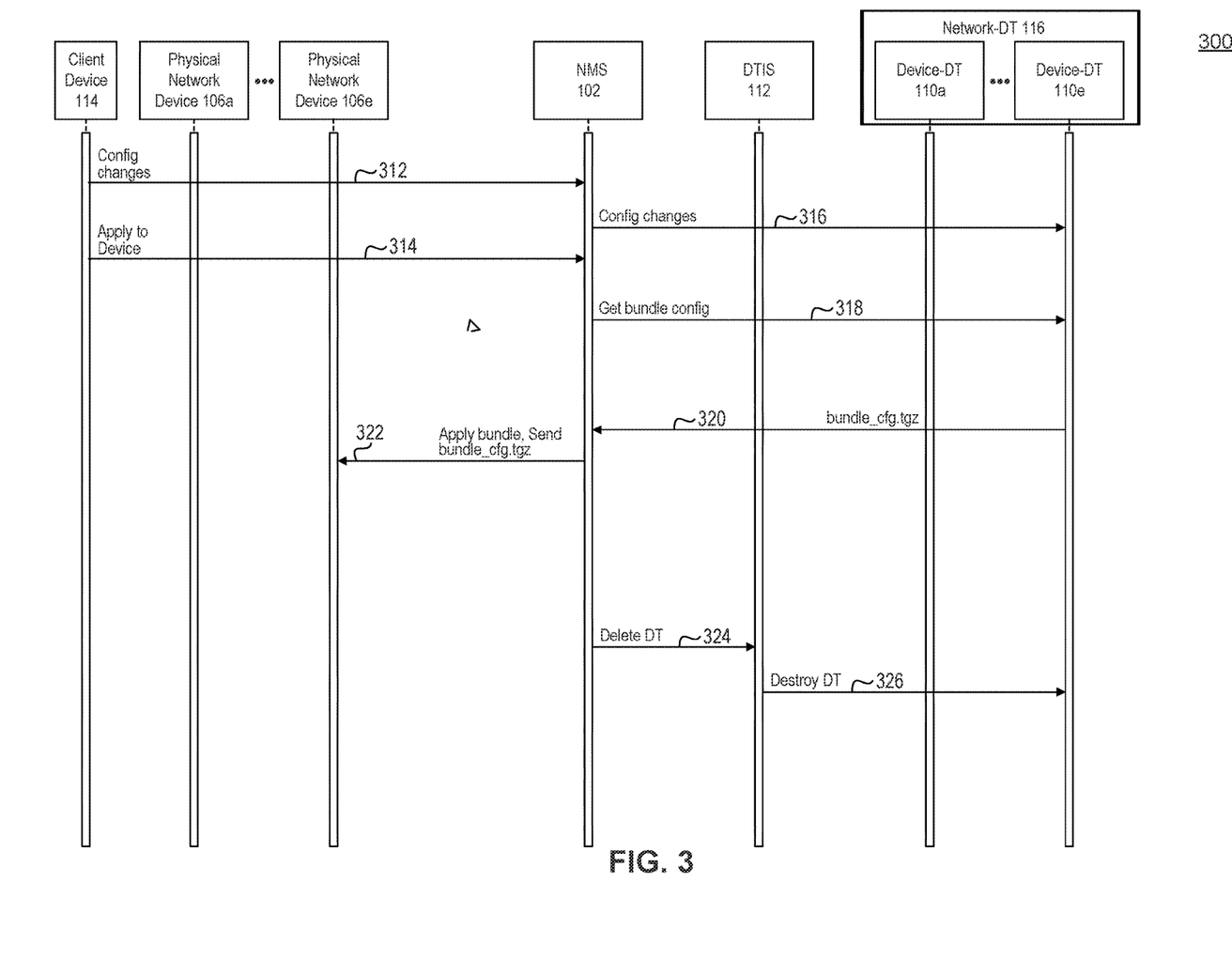
FIG. 3 illustrates an example exchange of communications that may occur for synchronizing configuration changes between a network digital twin and a corresponding physical network, according to some aspects of this disclosure.

FIG. 3 illustrates an example exchange of communications that may occur for synchronizing configuration changes between a network digital twin and a corresponding physical network, according to some aspects of this disclosure. In the illustrated example, the network system 300 includes a client device 114, a physical network with physical network devices 106a-106e, NMS 102, DTIS 112, and network-DT 116 that includes device-DTs 110a-110e.

At 312, client device 114 sends a request to NMS 102 to initiate configuration changes to one or more device-DTs of network-DT 116. Alternatively, or additionally, client device 114 may send a request to initiate configuration changes directly to one or more device-DTs of network-DT 116. According to some aspects, client device 114 may want to validate an updated configuration on one or more device-DTs before implementing the updates at the counterpart physical network device. At 314, NMS 102 forwards the configuration change request to the device-DTs using the management channel.

At 316, client device 114 provides NMS 102 with test configuration details for implementation and testing. At 318, NMS 102 forwards the test configuration bundle to one or more device-DTs 110a-110e of network-DT 116 using the management channel. According to some aspects, the configuration of one or more device-DTs 110a-110e may be updated based on the received test configuration bundle. Furthermore, the control plane, management plane, and/or data plane operations of a physical network device (e.g., one of the physical network devices 106a-106e) can be validated using its corresponding device-DT instance (e.g., one of the device-DTs 110a-110e) with the updated configuration. The test configuration that is debugged and/or validated using network-DT 116 may subsequently be implemented at physical network 104. According to some aspects, validating the test configuration includes running traffic through network-DT 116.

At 320, the updated configuration of the device-DT instances is synchronized with a running configuration of the physical network devices in the physical network 104. NMS 102 initiates the synchronization process and network-DT 116 sends the validated test configuration bundle to physical network devices 106a-106e.

At 322, NMS 102 sends the validated test configuration to physical network 104. The validated configuration is then applied to the corresponding physical network devices 106a-106e. At 324, NMS 102 may send a request to DTIS 112 to delete one or more device-DT instances (e.g., device-DTs 110a-110e) corresponding to the physical network devices 106a-106e. According to some aspects, in response to receiving the request to delete one or more device-DT instances, virtual links corresponding to the deleted device-DT instances are also destroyed within network-DT 116. At 326, the device-DT instance corresponding to the physical device 106e (e.g., device-DT 110e) is destroyed, and the processing resources are released.

Figure 4:
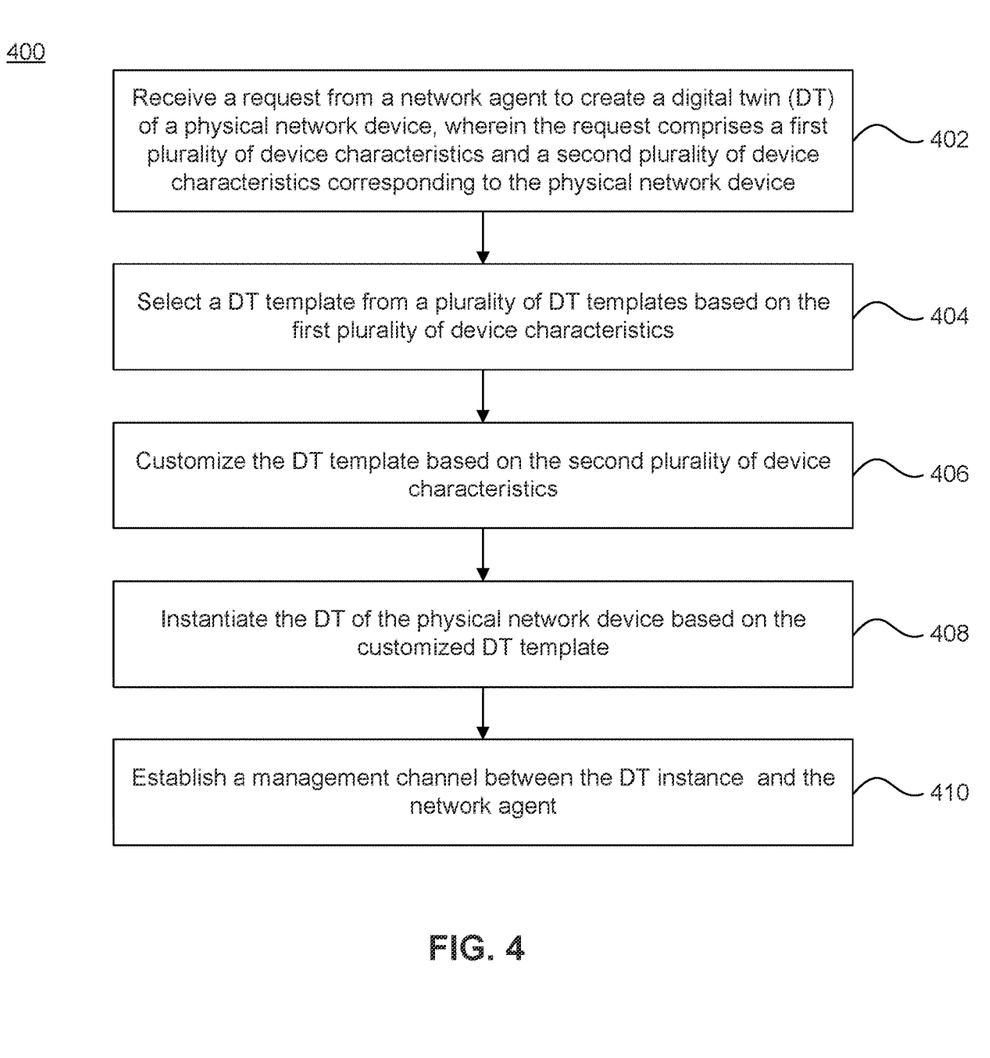
FIG. 4 illustrates an exemplary method to generate a device digital twin instance of a physical network device, according to some aspects of this disclosure.

FIG. 4 is a conceptual diagram illustrating an exemplary method 400 to generate a device digital twin (device-DT) instance of a physical network device, according to some aspects of this disclosure. As a convenience and not a limitation, FIG. 4 may be described with regard to elements of FIGS. 1-3 and 6. Method 400 may be performed by, for example, digital twin instantiation service (DTIS) 112. Method 400 may also be performed by computer system 600 of FIG. 6. But method 400 is not limited to the specific aspects depicted in those figures, and other systems may be used to perform the method as will be understood by those skilled in the art. It is to be appreciated that not all operations may be needed, and the operations may not be performed in the same order as shown in FIG. 4.

At 402, a request to generate a device digital twin (device-DT) instance corresponding to a physical network device located within physical network 104 is received from a network management system (NMS). For example, the DTIS (e.g., DTIS 112) can receive the request to generate the device-DT instance corresponding to a physical network device (e.g., one of the physical network devices 106a-106e). The request can include at least a first plurality and a second plurality of device characteristics corresponding to the physical network device. According to some aspects, the first plurality of device characteristics includes one or more of the hardware attributes of the physical network device including device model, device serial number, media access control (MAC) address, device expansion module type, or stacking composition.

According to some aspects, DTIS 112 may store a plurality of virtual-replica templates corresponding to various types of physical network devices. Each virtual-replica template may define a superset of hardware and software attributes corresponding to a respective type of network device.

At 404, a virtual-replica template from a plurality of virtual-replica templates is selected based on the first plurality of device characteristics. For example, the DTIS (e.g., DTIS 112) selects the virtual-replica template from the plurality of virtual-replica templates. According to some aspects, the first plurality of device characteristics may include one or more of the hardware attributes of the physical network device including device model, device serial number, media access control (MAC) address, device expansion module type, interface module type, or stacking composition.

At 406, once a suitable virtual-replica template is selected based on the first plurality of device characteristics (e.g., the device model, the serial number, or the like), the virtual-replica template is customized based on the second plurality of device characteristics. For example, the DTIS (e.g., DTIS 112) customizes the virtual-replica template based on the second plurality of device characteristics. According to some aspects, the second plurality of device characteristics may include a running configuration of the physical network device, where the running configuration includes one or more software attributes including network operating system type, network operating system version, or feature licenses. According to some aspects, the second plurality of device characteristics includes limit memory and request memory values, where the limit memory and the request memory values may be provisioned based on the type and the model of the physical network device. Furthermore, the second plurality of device characteristics may include network connectivity information learned by the physical network device (e.g., one of the physical network devices 106a-106e) through network discovery.

At 408, the device-DT instance of the physical network device is generated based on the customized virtual-replica template. According to some aspects, DTIS 112 may be configured to instantiate the customized virtual-replica template to generate a virtual replica of the corresponding physical network device.

At 410, a management channel is established between the device-DT instance (e.g., device-DT 110a-110e) and the NMS. According to some aspects, the management channel is established, via the DTIS (e.g., DTIS 112), between each device-DT (e.g., device-DTs 110a-110e) and the NMS (e.g., NMS 102). According to some aspects, a request to modify one or more device-DT configurations may be received, by the DTIS, from the NMS receive over the management channel. According to some aspects, the configuration of a device-DT instance may be updated based on the request to modify configuration, and the updated configuration of the device-DT instance and a running configuration of the corresponding physical network device are synchronized using the management channel. According to some aspects, a change in the configuration of a physical network device (e.g., one of the physical network devices 106a-106e) may initiate a synchronization procedure between the physical network device and its corresponding device-DT in the network-DT 116. Similarly, a change in the configuration of a device-DT (e.g., one of the device-DTs 110a-110e) may initiate a synchronization procedure between the device-DT and its corresponding physical network device in physical network 104. According to some aspects, the control plane, management plane, and data plane operations of the physical network device may be validated using the device-DT with the updated configuration.

Figure 5:
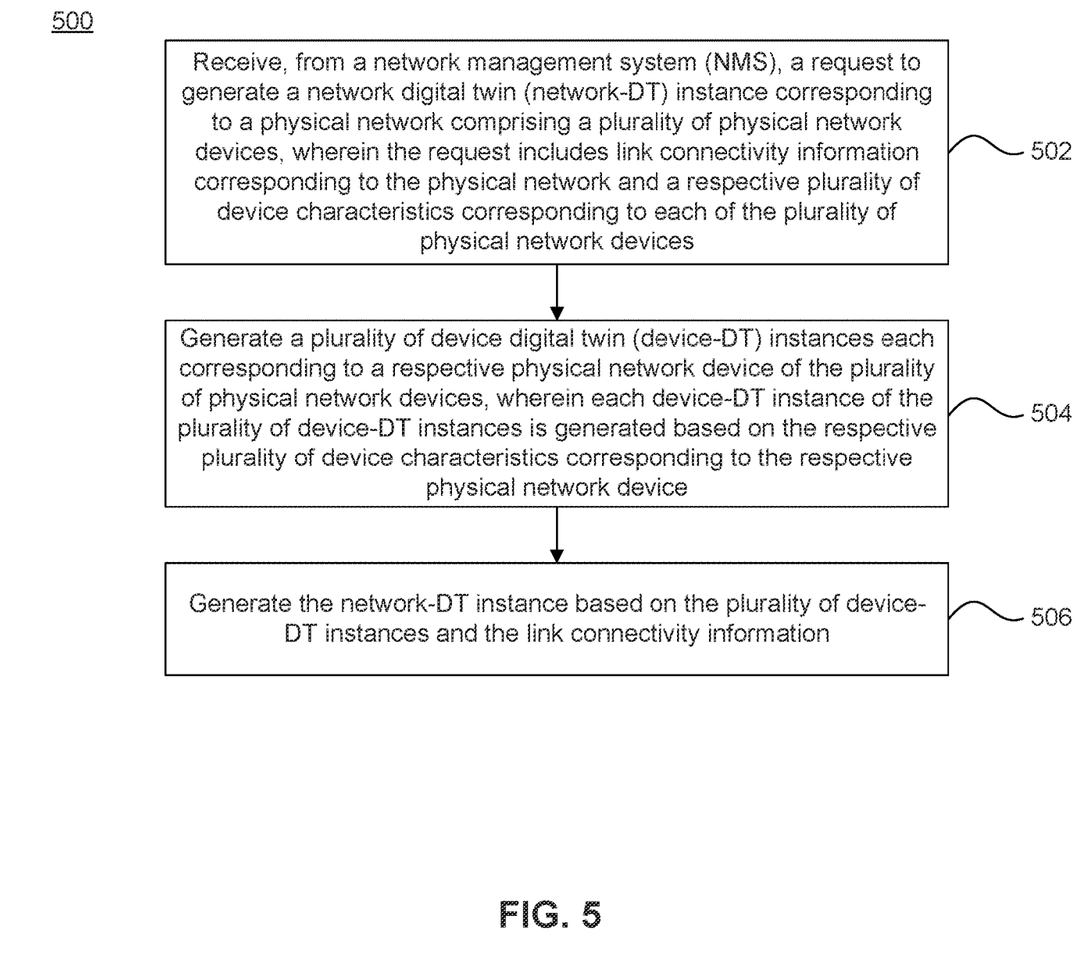
FIG. 5 illustrates an exemplary method to generate a network digital twin instance of a physical network, according to some aspects of this disclosure.

FIG. 5 is a conceptual diagram illustrating an exemplary method 500 to generate a network digital twin (network-DT) instance of a physical network, according to some aspects of this disclosure. As a convenience and not a limitation, FIG. 5 may be described with regard to elements of FIGS. 1-3 and 6. Method 500 may be performed by, for example, DTIS 112. Method 500 may also be performed by computer system 600 of FIG. 6. But method 500 is not limited to the specific aspects depicted in those figures, and other systems may be used to perform the method as will be understood by those skilled in the art. It is to be appreciated that not all operations may be needed, and the operations may not be performed in the same order as shown in FIG. 5.

At 502, a request to generate a network digital twin (network-DT) instance corresponding to a physical network (e.g., physical network 104) including a plurality of physical network devices (e.g., physical network devices 106a-106e) is received from a network management system (NMS). For example, the DTIS (e.g., DTIS 102) can receive the request to generate the network-DT instance. According to some aspects, the request includes link connectivity information corresponding to the physical network and a respective plurality of device characteristics corresponding to each of the plurality of physical network devices. Additionally, or alternatively, the DTIS (alone or in combination with the NMS) can determine the link connectivity information corresponding to the physical network and the respective plurality of device characteristics corresponding to each of the plurality of physical network devices from the physical network. For example, the DTIS (alone or in combination with the NMS) can "read" the link connectivity information and/or the respective plurality of device characteristics from the physical network At 504, a plurality of device digital twin (device-DT) instances 110a-110e, each corresponding to a respective physical network device of the plurality of physical network devices, are generated. For example, the DTIS can generate the device-DT instances. According to some aspects, each device-DT instance of the plurality of device-DT instances is generated based on the respective plurality of device characteristics corresponding to the respective physical network device.

According to some aspects, to generate a device-DT instance of the plurality of device-DT instances, the DTIS (e.g., DTIS 112) may select a virtual-replica template from a plurality of virtual-replica templates based on a first plurality of device characteristics of the respective plurality of device characteristics. DTIS 112 may then customize the virtual-replica template based on the second plurality of device characteristics of the respective plurality of device characteristics and generate the device-DT instance of the physical network device based on the customized virtualized-replica template.

At 506, the network-DT instance is generated based on the plurality of device-DT instances and the link connectivity information. According to some aspects, the link connectivity information may be obtained by the NMS (e.g., NMS 102) by receiving layer 2 and layer 3 connectivity information that the physical network devices (e.g., physical network devices 106a-106e) may learn through network discovery. According to some aspects, the physical network devices (e.g., physical network devices 106a-106e) may obtain link connectivity information using traceroute, simple network management protocol (SNMP) and/or link layer discovery protocol (LLDP).

According to some aspects, a management channel between each of network-DT instances 110a-110e of network-DT 116 and the NMS is established. According to some aspects, the management channel is established, via the DTIS (e.g., DTIS 112), between the network-DTs (e.g., network-DTs 110a-110e) and the NMS (e.g., NMS 102). According to some aspects, each of the individual DT-devices within the created network-DT instance 116 have an established communication channel with NMS 102, via hyper text transfer protocol (HTTP), SSH, or RPC. According to some aspects, a request to modify the network-DT configuration may be received, by the DTIS, from the NMS over the management channel. According to some aspects, the configuration of the network-DT instance may be updated based on the request to modify the configuration, and the updated configuration of the network-DT instance and a running configuration of the physical network (e.g., physical network 104) are synchronized using the management channel. According to some aspects, a change in the topology and/or configuration of the physical network 104 may automatically initiate a synchronization procedure between the network-DT 116 and NMS 102. According to some aspects, a change in the topology of physical network 104 may include the addition and/or removal of physical network devices and the addition and/or deletion of network interconnection links. For example, if physical network device 106e were removed from physical network 104, the corresponding digital twin device 110e would be removed from network-DT 116. Similarly, if a new physical network device were added to the physical network 104, a corresponding device-DT instance would be generated in the network-DT 116. According to some aspects, the control plane, management plane, and data plane operations of the physical network 104 may be validated using the network-DT with the updated configuration.

Figure 6:
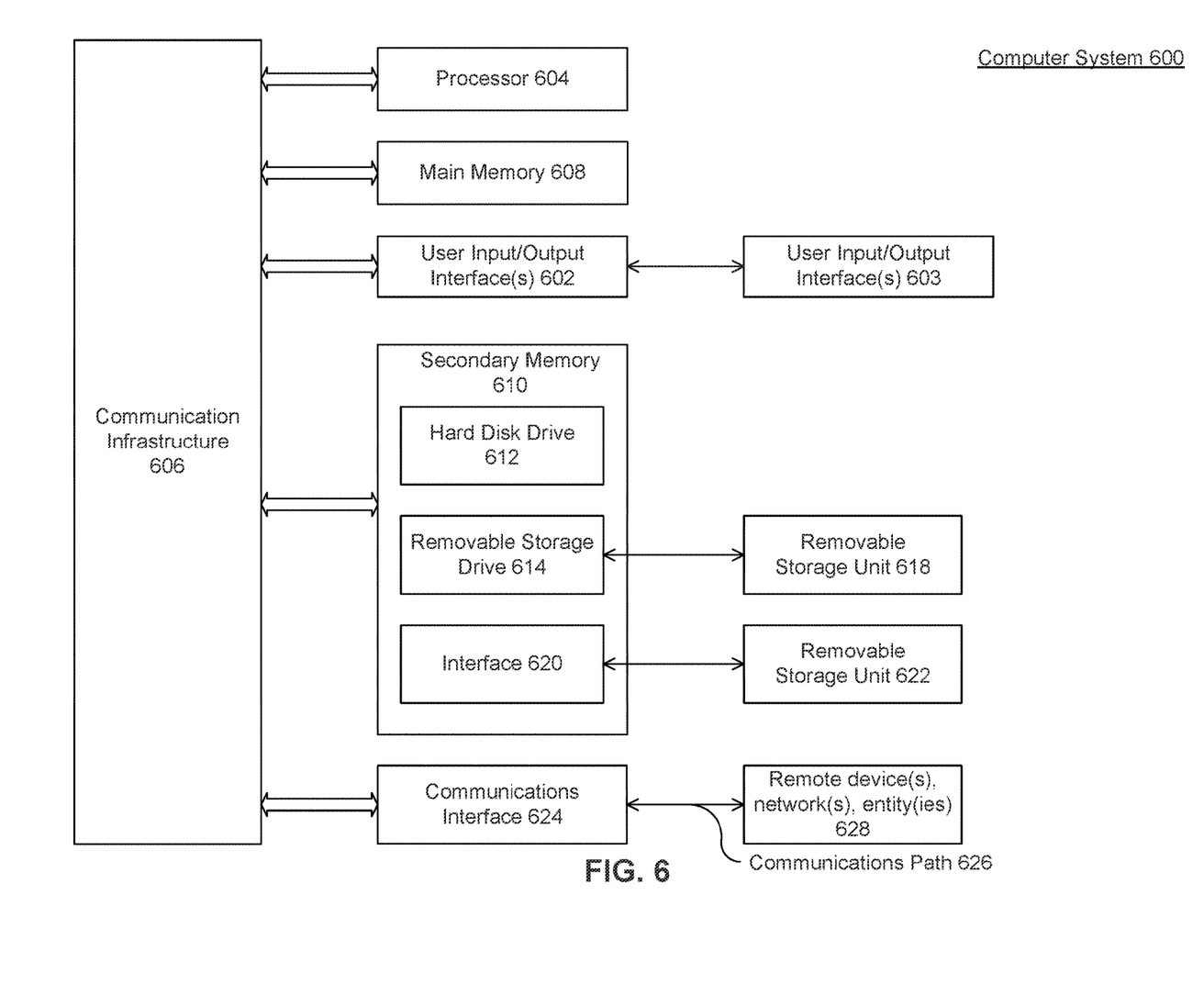
FIG. 6 is an example computer system for implementing some aspects or portion(s) thereof.

Various aspects may be implemented, for example, using one or more well-known computer systems, such as computer system 600 shown in FIG. 6. One or more computer systems 600 may be used, for example, to implement any of the aspects discussed herein, as well as combinations and sub-combinations thereof.

Computer system 600 may include one or more processors (also called central processing units, or CPUs), such as a processor 604. Processor 604 may be connected to a communication infrastructure or bus 606.

Computer system 600 may also include user input/output device(s) 603, such as monitors, keyboards, pointing devices, etc., which may communicate with communication infrastructure 606 through user input/output interface(s) 602.

One or more of processors 604 may be a graphics processing unit (GPU). In an aspect, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some aspects, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

Based on the teachings contained in this disclosure, it will be apparent to persons skilled in the relevant art(s) how to make and use aspects of this disclosure using data processing devices, computer systems and/or computer architectures other than that shown in FIG. 6. In particular, aspects can operate with software, hardware, and/or operating system implementations other than those described herein.

It is to be appreciated that the Detailed Description section, and not any other section, is intended to be used to interpret the claims. Other sections can set forth one or more but not all exemplary aspects as contemplated by the inventor(s), and thus, are not intended to limit this disclosure or the appended claims in any way.

While this disclosure describes exemplary aspects for exemplary fields and applications, it should be understood that the disclosure is not limited thereto. Other aspects and modifications thereto are possible, and are within the scope and spirit of this disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative aspects can perform functional blocks, steps, operations, methods, etc. using orderings different than those described herein.

References herein to "one aspect," "an aspect," "an example aspect," or similar phrases, indicate that the aspect described can include a particular feature, structure, or characteristic, but every aspect can not necessarily include the particular feature, structure, or characteristic. Moreover, such phrases are not necessarily referring to the same aspect. Further, when a particular feature, structure, or characteristic is described in connection with an aspect, it would be within the knowledge of persons skilled in the relevant art(s) to incorporate such feature, structure, or characteristic into other aspects whether or not explicitly mentioned or described herein. Additionally, some aspects can be described using the expression "coupled" and "connected" along with their derivatives. These terms are not necessarily intended as synonyms for each other. For example, some aspects can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary aspects, but should be defined only in accordance with the following claims and their equivalents.

What is claimed is:

1. A system, comprising:
    a memory; and
    one or more processors coupled to the memory and configured to:
    receive, from a network management system (NMS), a request to generate a network digital twin (network-DT) instance corresponding to a physical network comprising a plurality of physical network devices, wherein the request includes link connectivity information corresponding to the physical network and a respective plurality of device characteristics corresponding to each of the plurality of physical network devices;
    generate a plurality of device digital twin (device-DT) instances each corresponding to a respective physical network device of the plurality of physical network devices, wherein each device-DT instance of the plurality of device-DT instances is generated based on the respective plurality of device characteristics corresponding to the respective physical network device, wherein to generate a device-DT instance of the plurality of device-DT instances, the one or more processors are further configured to:
        select a virtual-replica template from a plurality of virtual-replica templates based on a first plurality of device characteristics of the respective plurality of device characteristics;
        customize the virtual-replica template based on a second plurality of device characteristic of the respective plurality of device characteristics; and
        generate the device-DT instance of the physical network device based on the customized virtual-replica template; and
    generate the network-DT instance based on the plurality of device-DT instances and the link connectivity information.

2. The system of claim 1, wherein the one or more processors are further configured to:
    receive, over a management channel, a request to modify configuration of the network-DT from the NMS, wherein the request to modify the configuration includes a set of modified configuration parameters;
    update the configuration of the network-DT instance based on the modified configuration parameters; and
    synchronize, using the management channel, the updated configuration of the network-DT instance and a running configuration of the plurality of physical network devices corresponding to the physical network.

3. The system of claim 2, wherein the one or more processors are further configured to:
    validate control plane, management plane, and data plane operations using the network-DT with the updated configuration.

4. The system of claim 1, wherein the first plurality of device characteristics comprises one or more of the following hardware attributes of the physical network device: device model, device serial number, media access control (MAC) address, and stacking composition.

5. The system of claim 1, wherein the second plurality of device characteristics comprises a running configuration of the physical network device and device configuration parameters of the physical network device, wherein the running configuration includes one or more of the following software attributes: network operating system type, network operating system version, and feature licenses.

6. The system of claim 1, wherein a configuration of the network-DT includes the link connectivity information corresponding to the physical network.

7. The system of claim 1, wherein the link connectivity information comprises identities of directly connected neighboring devices for each physical network device of the plurality of physical network devices and ports that are used for connecting to the neighboring devices.

8. A method for generating a network digital twin (network-DT) instance corresponding to a physical network comprising a plurality of physical network devices, the method comprising:
receiving, from a network management system (NMS), a request to generate the network-DT instance corresponding to the physical network, wherein the request includes link connectivity information corresponding to the physical network and a respective plurality of device characteristics corresponding to each of the plurality of physical network devices;
generating a plurality of device digital twin (device-DT) instances each corresponding to a respective physical network device of the plurality of physical network devices, wherein each device-DT instance of the plurality of device-DT instances is generated based on the respective plurality of device characteristics corresponding to the respective physical network device, wherein generating a device-DT instance of the plurality of device-DT instances further comprises:
selecting a virtual-replica template from a plurality of virtual-replica templates based on a first plurality of device characteristics of the respective plurality of device characteristics;
customizing the virtual-replica template based on a second plurality of device characteristic of the respective plurality of device characteristics; and
generating the device-DT instance of the physical network device based on the customized virtual-replica template; and
generating the network-DT instance based on the plurality of device-DT instances and the link connectivity information.

9. The method of claim 8, further comprising:
receiving, over a management channel, a request to modify a configuration of the network-DT from the NMS, wherein the request to modify the configuration includes a set of modified configuration parameters;
update the configuration of the network-DT instance based on the modified configuration parameters; and
synchronize, using the management channel, the updated configuration of the network-DT instance and a running configuration of the plurality of physical network devices corresponding to the physical network.

10. The method of claim 9, further comprising:
validating control plane, management plane, and data plane operations using the network-DT with the updated configuration.

11. The method of claim 8, wherein the first plurality of device characteristics comprises one or more of the following hardware attributes of the physical network device: device model, device serial number, media access control (MAC) address, and stacking composition.

12. The method of claim 8, wherein the second plurality of device characteristics comprises a running configuration of the physical network device and device configuration parameters of the physical network device, wherein the running configuration includes one or more of the following software attributes: network operating system type, network operating system version, and feature licenses.

13. The method of claim 8, wherein a configuration of the network-DT includes the link connectivity information corresponding to the physical network.

14. The method of claim 8, wherein the link connectivity information comprises identities of directly connected neighboring devices for each physical network device of the plurality of physical network devices and ports that are used for connecting to the neighboring devices.

15. A non-transitory computer-readable medium (CRM) having instructions stored thereon that, when executed by at least one computing device, cause the at least one computing device to perform operations comprising:
receiving, from a network management system (NMS), a request to generate a network digital twin (network-DT) instance corresponding to a physical network comprising a plurality of physical network devices, wherein the request includes link connectivity information corresponding to the physical network and a respective plurality of device characteristics corresponding to each of the plurality of physical network devices;
generating a plurality of device digital twin (device-DT) instances each corresponding to a respective physical network device of the plurality of physical network devices, wherein each device-DT instance of the plurality of device-DT instances is generated based on the respective plurality of device characteristics corresponding to the respective physical network device, wherein generating a device-DT instance of the plurality of device-DT instances comprises:
selecting a virtual-replica template from a plurality of virtual-replica templates based on a first plurality of device characteristics of the respective plurality of device characteristics;
customizing the virtual-replica template based on a second plurality of device characteristic of the respective plurality of device characteristics; and
generating the device-DT instance of the physical network device based on the customized virtual-replica template; and
generating the network-DT instance based on the plurality of device-DT instances and the link connectivity information.

16. The non-transitory CRM of claim 15, the operations further comprising:
receiving, over a management channel, a request to modify a configuration of the network-DT from the NMS, wherein the request to modify the configuration includes a set of modified configuration parameters;
updating the configuration of the network-DT instance based on the modified configuration parameters; and
synchronizing, using the management channel, the updated configuration of the network-DT instance and a running configuration of the plurality of physical network devices corresponding to the physical network.

17. The non-transitory CRM of claim 16, the operations further comprising:
validating control plane, management plane, and data plane operations using the network-DT with the updated configuration.

18. The non-transitory CRM of claim 15, wherein the first plurality of device characteristics comprises one or more of the following hardware attributes of the physical network device: device model, device serial number, media access control (MAC) address, and stacking composition.

19. The non-transitory CRM of claim 15, wherein the second plurality of device characteristics comprises a running configuration of the physical network device and device configuration parameters of the physical network device, wherein the running configuration includes one or more of the following software attributes: network operating system type, network operating system version, and feature licenses.

20. The non-transitory CRM of claim 15, wherein the link connectivity information comprises identities of directly connected neighboring devices for each physical network device of the plurality of physical network devices and ports that are used for connecting to the neighboring devices.

* * * * *

UNITED STATES PATENT AND TRADEMARK OFFICE
CERTIFICATE OF CORRECTION

| | | |
|---|---|---|
| PATENT NO. | : 12,407,572 B2 | Page 1 of 1 |
| APPLICATION NO. | : 18/521543 | |
| DATED | : September 2, 2025 | |
| INVENTOR(S) | : Garg et al. | |

It is certified that error appears in the above-identified patent and that said Letters Patent is hereby corrected as shown below:

In the Claims

In Column 16, Claim 2, Line 35, delete "modify" and insert -- modify a --, therefor.

Signed and Sealed this
Eleventh Day of November, 2025

John A. Squires
*Director of the United States Patent and Trademark Office*